United States Patent
Hasegawa et al.

(10) Patent No.: US 11,029,904 B2
(45) Date of Patent: Jun. 8, 2021

(54) PRINTING APPARATUS CAPABLE OF CONVERTING IMAGE DATA

(71) Applicant: BROTHER KOGYO KABUSHIKI KAISHA, Nagoya (JP)

(72) Inventors: Wataru Hasegawa, Konan (JP); Koichi Tsugimura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/797,203

(22) Filed: Feb. 21, 2020

(65) Prior Publication Data

US 2020/0272390 A1 Aug. 27, 2020

(30) Foreign Application Priority Data

Feb. 22, 2019 (JP) .............................. JP2019-030438

(51) Int. Cl.
*G06F 3/12* (2006.01)

(52) U.S. Cl.
CPC .......... *G06F 3/1265* (2013.01); *G06F 3/1206* (2013.01); *G06F 3/1248* (2013.01); *G06F 3/1298* (2013.01)

(58) Field of Classification Search
None
See application file for complete search history.

(56) References Cited

U.S. PATENT DOCUMENTS

| 8,294,928 B2 * | 10/2012 | Okabe | H04N 1/32122 358/1.15 |
| 2008/0297838 A1 * | 12/2008 | Matsui | G06F 3/1214 358/1.15 |
| 2015/0062606 A1 * | 3/2015 | Suzuki | H04N 1/00928 358/1.13 |
| 2017/0223210 A1 | 8/2017 | Yamada | |
| 2017/0272587 A1 * | 9/2017 | Kondoh | G06F 3/1254 |

FOREIGN PATENT DOCUMENTS

JP     2017-134718 A     8/2017

* cited by examiner

Primary Examiner — Thomas D Lee
(74) Attorney, Agent, or Firm — Merchant & Gould P.C.

(57) ABSTRACT

In a printing apparatus, a job-management module causes a computer to: determine whether the computer executes a second conversion processing; when the second conversion processing is to be executed, input a first instruction to a first sub-module to execute a first conversion processing to store first converted data into the memory, input a second instruction to a second sub-module to execute a second conversion processing to store second converted data into the memory, and input a third instruction to a third sub-module to execute a third conversion processing to output print data; and when the second conversion processing is not to be executed, input a first ganged-fashion-execution instruction to the first sub-module to execute the first conversion processing to input the first converted data to an electronic circuit, and input a second ganged-fashion-execution instruction to the third sub-module to output the print data.

7 Claims, 7 Drawing Sheets

PRINTING APPARATUS CAPABLE OF CONVERTING IMAGE DATA

CROSS REFERENCE TO RELATED APPLICATION

The present application claims priority from Japanese Patent Application No. 2019-030438, which was filed on Feb. 22, 2019, the disclosure of which is herein incorporated by reference in its entirety.

BACKGROUND

The following disclosure relates to a printing apparatus configured to convert image data to print data to perform printing.

There is known a printer that receives print data described in, e.g., a page description language (PDL), from a printer driver installed in a terminal device such as a personal computer and performs printing on a sheet based on the received print data.

The printer driver installed in the terminal device such as the personal computer uses a random-access memory (RAM) of a memory of the terminal device to convert image data for printing to print data in a form in which the printer can perform printing, and output the obtained print data.

SUMMARY

Printers configured to perform printing by receiving image data from a terminal device not via a printer driver are desired recently. That is, printers capable of receiving image data from the terminal device and performing printing by converting the received image data to print data have been desired.

Accordingly, an aspect of the disclosure relates to a printing apparatus with a short length of time required for converting image data to print data.

In one aspect of the disclosure, a printing apparatus includes a controller. The controller includes: a memory; a computer; a program including a plurality of modules executable by the computer; a first electronic circuit configured to convert and output input data; and a second electronic circuit configured to convert and output input data and configured to execute a conversion different from a conversion executed by the first electronic circuit, the second electronic circuit being connected to the first electronic circuit by a connection line. The plurality of modules include: a reception module configured to cause the computer to execute a receiving processing in which the computer receives image data and a print setting; a registration module configured to cause the computer to execute a job-registration processing in which the computer registers a job based on the image data and the print setting, with a job-management module; and the job-management module configured to cause the computer to execute a job processing in which the computer creates print data by converting the image data indicated by the registered job, outputs the created print data, and processes the registered job. The job-management module includes: a first sub-module configured to cause the computer to execute a first conversion processing in which the computer uses the first electronic circuit to convert conversion target data related to the image data, to first converted data; a second sub-module configured to cause the computer to execute a second conversion processing in which the computer converts the first converted data to second converted data; a third sub-module configured to cause the computer to execute a third conversion processing in which the computer uses the second electronic circuit to convert the second converted data to the print data; and a fourth sub-module configured to cause the computer to execute an output processing in which the computer outputs the print data. The job-management module being configured to cause the computer to execute: a judgement processing in which the computer determines whether the computer causes the second sub-module to execute the second conversion processing, based on at least one of the print setting indicated by the registered job and setting information stored in the memory; a non-ganged-fashion-execution instructing processing in which, when the computer determines that the second conversion processing is to be executed, the computer inputs, to the first sub-module, a first instruction for causing the computer to execute the first conversion processing to store the first converted data into the memory, the computer inputs, to the second sub-module, a second instruction for causing the computer to execute the second conversion processing to store the second converted data into the memory, and the computer inputs, to the third sub-module, a third instruction for causing the computer to execute the third conversion processing to output the print data; and a ganged-fashion-execution instructing processing in which, when the computer determines that the second conversion processing is not to be executed, the computer inputs, to the first sub-module, a first ganged-fashion-execution instruction for causing the computer to execute the first conversion processing to input the first converted data to the second electronic circuit via the connection line, and the computer inputs, to the third sub-module, a second ganged-fashion-execution instruction for causing the computer to output the print data based on data obtained by conversion executed by the second electronic circuit.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Hereinafter, there will be described one embodiment by reference to the drawings. It is to be understood that the following embodiment is described only by way of example, and the disclosure may be otherwise embodied with various modifications without departing from the scope and spirit of the disclosure. For example, the order of processings which will be described below may be changed without departing from the scope and spirit of the disclosure.

Figure 1A:
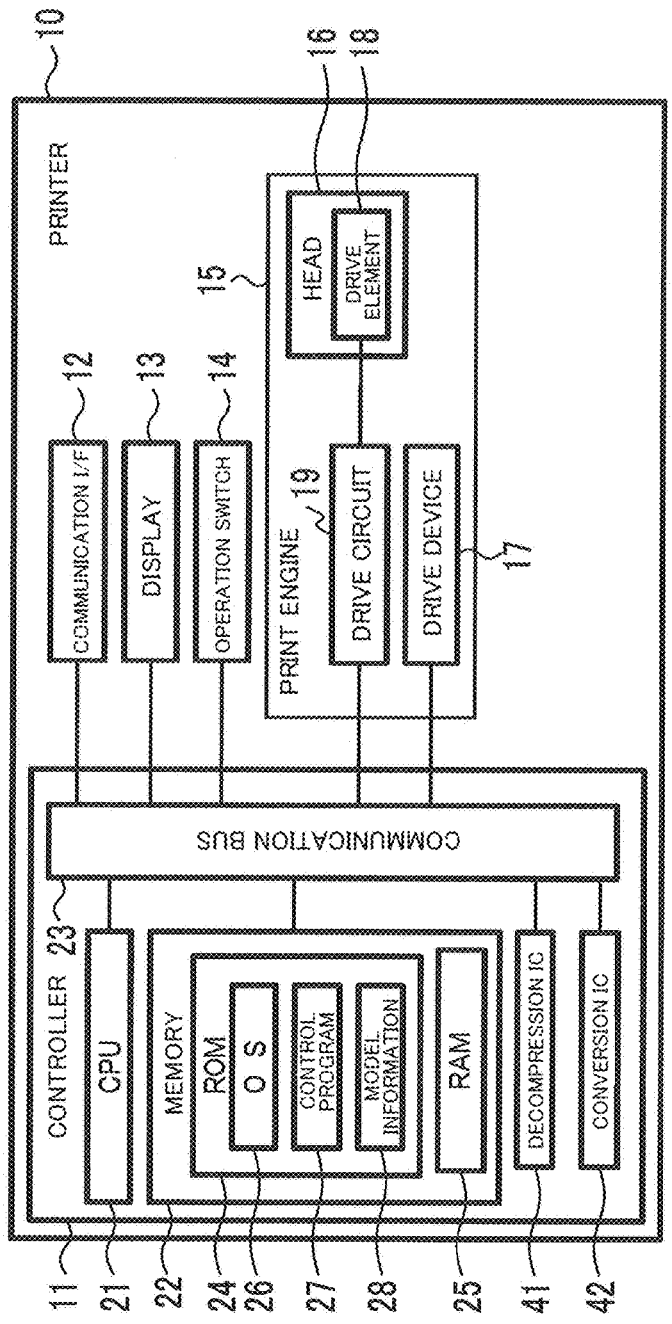
FIG. 1A is a view of a configuration of a printer.

There will be described a printer 10 according to the present embodiment with reference to FIGS. 1A and 1B. The printer 10 is capable of performing printing by receiving print data created by a printer driver installed in an information processing device such as a personal computer and capable of performing printing by receiving compressed image data. That is, the printer 10 is capable of receiving a print instruction not only from the information processing device installed with the printer driver but also from an information processing device not installed with the printer driver.

The printer 10 may be any of (i) an ink-jet printer configured to perform printing on a sheet by ejecting ink droplets onto the sheet, (ii) a laser printer configured to perform printing by pressing toner attached to a drum, against the sheet, and (iii) a thermal printer configured to perform printing on a sheet with film ink. That is, the printer 10 may perform printing on the sheet in any method. In the present embodiment, the printer 10 is the inkjet printer.

The printer 10 includes a controller 11, a communication interface 12, a display 13, an operation switch 14, and a print engine 15.

The communication interface 12 is connected to a communication network, not illustrated. The communication network is connected to the information processing device. That is, the communication interface 12 is connected to the information processing device over the communication network. Examples of the communication network include a universal-serial-bus (USB) cable, a wired local-area network (LAN), a wireless LAN, a wide area network (WAN), and the Internet. That is, the communication network may be of any type of the communication network as long as the compressed image data is transmittable from the information processing device to the printer 10. It is noted that the printer 10 need not be connected to the communication network as long as a portable storage medium such as a USB memory is mountable on the printer 10, and the compressed image data is inputtable to the printer 10.

The display 13 includes: a display panel configured to display characters and figures; and a transparent film-like touch sensor superposed on the display panel. That is, the display 13 is what is called a touch screen. It is noted that the display 13 may include only the display panel.

The operation switch 14 is configured to receive operational inputs of a user. It is noted that the printer 10 may include only one of the operation switch 14 and the touch sensor of the display 13.

The print engine 15 includes a sheet-supply tray, a supply roller, a conveying roller, a head 16, an output roller, a sheet-output tray, and a drive device 17. The drive device 17, for example, includes one or more motors and drives and rotates the supply roller and the conveying roller. The sheet placed on the sheet-supply tray is supplied from the sheet-supply tray by the supply roller being rotated and is then conveyed by the conveying roller being rotated. While the sheet is being conveyed by the conveying roller, the head 16 ejects ink droplets to print an image on the sheet. That is, the print engine 15 conveys the sheet, performs printing on the conveyed sheet, and discharges the printed sheet to the sheet-output tray.

The head 16 includes drive elements 37 each configured to eject ink droplets. The drive element 37 is a piezoelectric element or a heater, for example. When a direct-current voltage is applied to the piezoelectric element, the piezoelectric element is deformed to eject the ink droplet. When a direct-current voltage is applied to the heater, the heater heats ink to cause bumping of the ink to eject the ink droplet. The print engine 15 includes a drive circuit 19 configured to apply a direct-current voltage to the drive elements 37 to drive the drive elements 37. The drive circuit 19 selectively applies the direct-current voltage to one or ones of the drive elements 37 at the timing and a voltage value related to input print data.

The controller 11 includes: a central processing unit (CPU) 21; a memory 22 configured to store programs, information, and data; a communication bus 23; and various integrated circuits (ICs). The CPU 21 is one example of a computer.

The controller 11, for example, is constituted by a pattern circuit board and electronic components mounted on the pattern circuit board, such as microcomputers, various ICs, capacitors, and diodes. The various ICs include a decompression IC 41 and a conversion IC 42 illustrated in FIG. 1B. The decompression IC 41 and the conversion IC 42 will be described below.

The CPU 21 and the memory 22 are connected to the communication bus 23. The CPU 21 executes an operating system (OS) 26 and a control program 27, which will be described below, stored in the memory 22. The OS 26 and the control program 27 executable by the CPU 21 read data and information from the memory 22 or write data and information into the memory 22. These operations will be described later in detail.

The communication bus 23 is connected to the communication interface 12, the display 13, the operation switch 14, and the drive device 17 and the drive circuit 19 of the print engine 15. That is, the CPU 21 that executes the OS 26 and the control program 27 which will be described below is capable of: receiving information and data from the information processing device via the communication interface 12; displaying characters and images on the display 13; receiving user's instruction via the touch sensor of the display 13 and/or the operation switch 14; and inputting information and data to the drive device 17 and the drive circuit 19 of the print engine 15.

The memory 22 includes a read-only memory (ROM) 24 and a random-access memory (RAM) 25. In addition to the ROM 24 and the RAM 25, the memory 22 may include an electrically erasable programmable ROM (EEPROM), a hard disk drive (HDD), a portable storage medium such as a USB memory, and a buffer of the CPU 21.

The memory 22 may be a storage medium readable by the computer. The storage medium readable by the computer is a non-transitory medium. In addition to the above-described examples, examples of the non-transitory medium include storage media such as a CD-ROM and a DVD-ROM. The non-transitory medium is also a tangible medium. An electric signal that transfers a program downloaded from, e.g., a server on the Internet is a signal medium readable by the computer as one kind of the medium readable by the computer but is not included in the non-transitory storage medium readable by the computer.

The ROM 24 stores the OS 26 and the control program 27. The control program 27 is one example of a program.

The ROM 24 stores model information 28 indicating the specifications of the printer 10. The model information 28, for example, includes: the model name of the printer 10; information indicating the sizes of sheets usable for printing of the printer 10; information indicating that the printer 10 is capable of performing color printing; information indicating that the printer 10 is capable of performing duplex printing; and information indicating the orientation of the sheet to be conveyed. In the case where a sheet of the A4 size is conveyed, examples of the information indicating the orientation of the sheet to be conveyed include: information indicating sheet supply in a state in which the longitudinal direction of the sheet coincides with the conveying direction; and information indicating sheet supply in a state in which the widthwise direction of the sheet coincides with the conveying direction. The model information 28 is stored in the ROM 24 as management-information-base (MIB) information, for example. It is noted that the model information 28 may be stored in the EEPROM. The model information 28 is one example of setting information stored in the memory.

The RAM 25 is to be used for execution of the OS 26 and the control program 27 and for execution of processings for creating the print data based on the compressed image data. These operations will be described later in detail.

The control program 27 is for receiving the compressed image data, converting the received compressed image data to the print data, outputting the print data to the drive circuit 19, and causing the print engine 15 to perform printing.

Figure 1B:
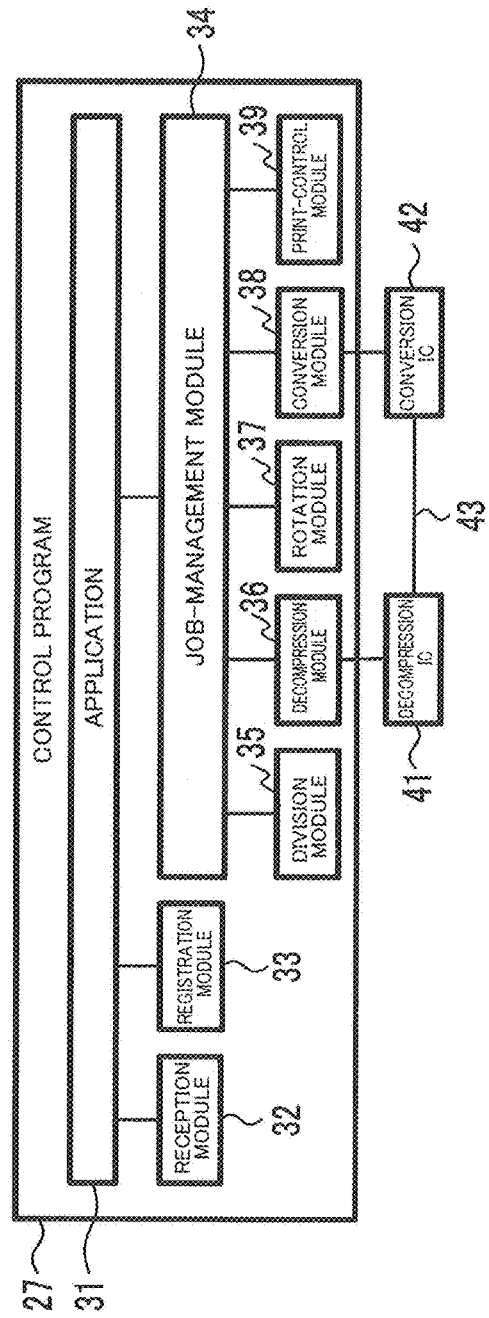
FIG. 1B is a view of a configuration of a control program.

As illustrated in FIG. 1B, the control program 27 includes a plurality of modules and an application 31 that is a protocol layer higher than the plurality of modules. The modules include a reception module 32, a registration module 33, and a job-management module 34. Modules lower than the job-management module 34 include a division module 35, a decompression module 36, a rotation module 37, a conversion module 38, and a print-control module 39. In the following description, the reception module 32, the registration module 33, the job-management module 34, the division module 35, the decompression module 36, the rotation module 37, the conversion module 38, and the print-control module 39 may be referred to as "the reception module 32 and so on". The division module 35, the decompression module 36, the rotation module 37, the conversion module 38, and the print-control module 39 may be referred to as "the division module 35 and so on". The decompression module 36 is one example of a first sub-module. The rotation module 37 is one example of a second sub-module. The conversion module 38 is one example of a third sub-module. The print-control module 39 is one example of a fourth sub-module. The division module 35 is one example of a fifth sub-module.

The application 31 and the reception module 32 and so on are executed in pseudo-parallel. That is, the application 31 and the reception module 32 and so on are executed as multitasking processings.

The reception module 32 executes a receiving processing for receiving the compressed image data (FIG. 6) that is data obtained by compressing image data. The reception module 32 receives the compressed image data from the information processing device via the communication interface 12 or receives the compressed image data input from, e.g., the USB memory mounted on the printer 10. The reception module 32 stores the received compressed image data into a specific storage area of the RAM 25 which is designated by the application 31.

The registration module 33 analyzes the compressed image data stored in the memory 22 by the reception module 32 to register a print job and a page job. When the compressed image data is received by the reception module 32, the registration module 33 registers the print job with the job-management module 34 which will be described below. The registration module 33 executes an analysis process (FIG. 3) for finding a page contained in the compressed image data without decompressing the compressed image data. When the page is found, the registration module 33 registers the page job with the job-management module 34. These operations will be described later in detail.

The job-management module 34 causes the lower division module 35 and so on to execute processings which will be described below to execute a processing for inputting print data into the drive circuit 19 of the print engine 15. That is, the job-management module 34 manages and processes the registered print job and page job.

The division module 35 creates a plurality of partial compressed data based on the compressed image data. The plurality of partial compressed data contain compressed data created by compressing image data for one page without decompressing the compressed image data. Specifically, it is considered that image data obtained by decompressing the compressed image data containing a plurality of pages cannot be processed due to the capacity of the RAM 25 of the memory 22, depending upon the resolution of the image represented by the image data. The division module 35 creates a partial compressed image for one page from the compressed image data without the decompression module 36, which will be described below, decompressing all the compressed image data. The division module 35 repeats the processing for creating the partial compressed data for one page from the compressed image data, to create partial compressed data for all the pages contained in the compressed image data. These operations will be described later in detail.

The decompression module 36 decompresses the partial compressed data created by the division module 35. Specifically, the decompression module 36 executes a processing of inputting the partial compressed data stored in the RAM 25 of the memory 22 to the decompression IC 41 and storing data output from the decompression IC 41, into the RAM 25.

The decompression IC 41 includes a converter circuit designed corresponding to a method of compressing the image data. The decompression IC 41 decompresses the input partial compressed data by using the converter circuit to process the input partial compressed data. The decompression IC 41 outputs decompressed page data. In the case where the data is decompressed using the IC, the data can be decompressed faster than decompressing the data using a program. The converter circuit of the decompression IC 41 is one example of a first electronic circuit. The decompressed page data is one example of decompressed partial data.

It is noted that a plurality of kinds of the decompression ICs 41 may be provided in the controller 11. One kind of the decompression IC 41 corresponds to one compression method. That is, the controller 11 may be capable of creating the print data based on image data compressed in a plurality of kinds of compression methods.

The rotation module 37 rotates an image that is represented by the decompressed page data stored in the memory 22 by the decompression module 36. Specifically, in the case where the model information 28 indicates sheet supply in the state in which the widthwise direction of the sheet coincides with the conveying direction, the image needs to be rotated by 90 degrees in order for the print engine 15 to print the image represented by the decompressed page data, on the sheet. In the case where information indicating that duplex printing is performable is contained in the model information 28, and the print setting indicates duplex printing, an image to be printed on a back surface of the sheet needs to be rotated 180 degrees in order for the print engine 15 to print the image represented by the decompressed page data, on the sheet. The rotation module 37 converts the decompressed page data requiring rotation and rotates the image represented by the decompressed page data. Unlike the decompression module 36, the rotation module 37 executes a processing for rotating the image as a processing using the program with no ICs.

The conversion module 38 converts the decompressed page data created by the decompression module 36 or the decompressed page data obtained by conversion of the rotation module 37, to the print data. Examples of the conversion include color conversion, error diffusion, and quinary conversion.

The color conversion is a processing of converting RGB (red, green, blue) color data containing the decompressed page data, to, e.g., BMCY color data based on which the print engine 15 can perform printing. BMCY represents black, magenta, cyan, and yellow.

The error diffusion is one of binary-conversion techniques and is conversion to be executed for improving the image quality.

The quinary conversion is conversion for determining, based on the decompressed page data, the voltage value of the direct-current voltage to be applied to the drive element 37. Examples of the voltage value include "small", "medium", "large", "extra-large", and "zero".

The conversion module 38 inputs the decompressed page data to the conversion IC 42 and stores the print data, which is converted data output by the conversion IC 42, into the RAM 25 of the memory 22.

The conversion IC 42 includes a converter circuit configured to execute computing for converting the input decompressed page data. The conversion IC 42 executes the color conversion, the error diffusion, and/or the quinary conversion by using the converter circuit to process the input decompressed page data. The converter circuit of the conversion IC 42 is one example of a second electronic circuit.

The conversion IC 42 is connected to the decompression IC 41 by a connection line 43. That is, the decompressed page data may be input directly from the decompression IC 41 to the conversion IC 42, and the decompressed page data after rotation may be input by the conversion module 38. The connection line 43 is a pattern of the pattern circuit board, for example.

It is noted that the conversion IC 42 may be constituted by a plurality of ICs including an IC configured to perform the color conversion, an IC configured to perform the error diffusion, and an IC configured to perform the quinary conversion. In this case, each of the ICs is connected by the connection line.

The print-control module 39 outputs the print data to the drive circuit 19 and outputs a drive signal to a drive circuit for the motor of the drive device 17 to cause the print engine 15 to perform printing.

There will be next described, with reference to FIGS. 2-6, processings in which the control program 27 creates the print data from the compressed image data and outputs the created print data. It is noted that the reception module 32, the registration module 33, and the job-management module 34 execute processings described below in response to receiving instructions from the application 31.

In the present specification, there will be principally described processings to be executed by the CPU 21 according to commands described in the control program 27. That is, the processings such as determination (judgement), extraction, selection, calculation, determination, identification, obtainment, reception, control, and setting in the following description represent the processings to be executed by the CPU 21. The processings to be executed by the CPU 21 include control of hardware via a controller such as the OS 26. It is noted that obtainment is to be used as a concept not requiring a request. That is, the processing in which the CPU 21 receives data without a request is included in the concept that the CPU 21 obtains data. In the present specification, data is represented by a bit string readable by the computer. Data substantially identical in meaning but different in format are treated as the same data. Information is treated in the same manner. The processings such as instruction, response, and requirement are to be executed by communication of information indicating instruction, response, and requirement, for example. The terms such as instruction, response, and requirement may be described in meaning of information itself indicating instruction, response, and requirement, for example.

The processings to be executed by the CPU 21 according to the commands described in the control program 27 may be simply described. For example, the expression "the CPU 21 executes a processing according to the control program 27" may be hereinafter referred to as "the CPU 21 executes a processing", "the controller 11 executes a processing", or "the control program 27 executes a processing".

In the present specification, the processing in which the CPU 21 determines whether information A indicates that a condition B is satisfied may be conceptually referred to as "the processing in which the CPU 21 determines based on the information A whether the condition B is satisfied". Also, the processing in which the CPU 21 determines whether information A indicates that the condition B is satisfied or a condition C is satisfied may be conceptually referred to as "the processing in which the CPU 21 determines based on the information A whether the condition B is satisfied or the condition C is satisfied".

In the present specification, each of data and information is represented by a bit or a bit string that can be treated by the computer. The computer can treat data without consideration of meaning indicated by each bit. In contrast, operations of the computer change depending upon meaning indicated by each bit in information. Instruction is a control signal for prompting a destination device to perform the next operation. Instruction may contain information and may have a property of information.

Moreover, data is treated as the same data as long as the data is recognized to represent the same meaning, even in the case where the form (e.g., the text format, the binary format, and the flag format) of the data varies with computer. This applies to information. For example, information representing "two" may be kept as information in the text format "0x32" in the ASCII code in some computer and kept as information in the binary format "10" in the binary expression in another computer.

It should be understood that the above-described distinction between data and information is not strict, and an exceptional treatment is allowed. For example, data may be temporarily treated as information, and information may be temporarily treated as data. Data treated in some device may be treated as information in another device. Information may be taken out from data, and data may be taken out from information.

The term "when" or "in response to" in the present specification indicates that a processing described after the character string is to be executed, in the case where the condition described before the character string is satisfied. It is noted that the timing of execution of the processing at least needs to be a timing after the condition is satisfied and need not be a timing just after the condition is satisfied.

Figure 2:
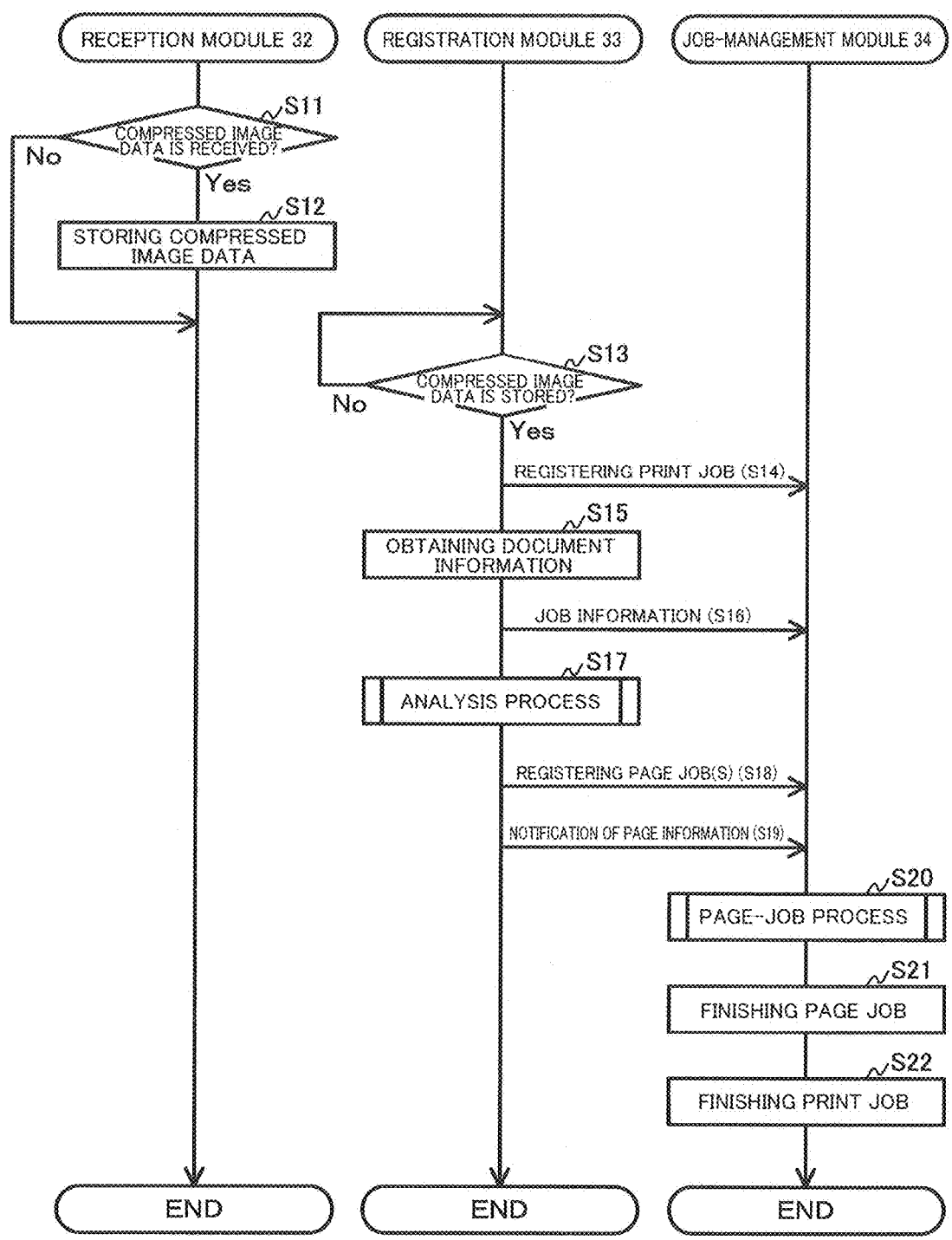
FIG. 2 is a view for explaining processings to be executed by a registration module and a job-management module by the time when received compressed image data is converted to print data and output.

As illustrated in FIG. 2, the reception module 32 at S11 receives, from the information processing device, inputs of document information, page header information, and the compressed image data (FIG. 6) created by compressing the image data representing an image of each page. The processing at S11 is one example of the receiving processing.

The compressed data, the document information, and the page header information are a set of data. In the example illustrated in FIG. 6, the compressed image data contains the document information, first-page header information, compressed data for a first-page image, second-page header information, compressed data for a second-page image, third-page header information, and compressed data for a third-page image.

The document information is a command for determining the type of data, for example. The page header information contains print settings and a resolution. Examples of the print settings include: information indicating the size of the sheet such as the A4 size and the A5 size; information indicating the type of the sheet such as a plain paper and a glossy paper; information indicating a printing side such as simplex printing and duplex printing; and information indicating a printing color such as black and white printing and color printing. The resolution is information representing the number of pixels of the page in the height direction and the number of pixels of the page in the width direction. For example, the resolution is 400 (width)×400 (height) or 600 (width)×600 (height).

As illustrated in FIG. 2, the reception module 32 at S12 stores the received compressed image data into the RAM 25 of the memory 22.

The registration module 33 at S13 determines whether the compressed image data is stored in the RAM 25. The registration module 33, for example, monitors a predetermined area of the RAM 25 stored in the compressed image data (S13: No) to determine whether the compressed image data is stored in the RAM 25.

When the registration module 33 determines that the compressed image data is stored in the RAM 25 (S13: Yes), the registration module 33 at S14 registers a print job with the job-management module 34. The processing at S14 is one example of a job-registration processing.

After registering the print job with the job-management module 34, the registration module 33 at S15 reads and obtains the document information contained in the compressed image data. The registration module 33 at S16 notifies the job-management module 34 of job information containing the print settings contained in the obtained document information.

The registration module 33 at S17 executes the analysis process for obtaining information about the page contained in the compressed image data (hereinafter referred to as "page information"). The page information is required to register the page job with the job-management module 34.

The page information identifies a first page, a second page, a third page, and so on contained in the compressed image data. For example, the page information identifies unit data indicating the last pixel of each page, in a plurality of unit data in the compressed image data. In the case where a portion of the compressed image data from the first byte to 300th byte indicates the first page, a portion of the compressed image data from the 301st byte to 500th byte indicates the second page, and a portion of the compressed image data from the 501st byte to 800th byte indicates the third page, for example, each of "300", "500", and "800" is the page information. It is noted that the page information is not limited to the data size in the compressed image data such as "300", "500", and "800" and may be other information or data as long as the information or data identifies each page. One byte is one example of unit data.

It is noted that the total number of pages and the above-described page information contained in the compressed image data are not contained in the document information contained in the compressed image data. The registration module 33 obtains the page information in the analysis process without the need of keeping all the image data created by decompressing the entire compressed image data. That is, a RAM with such a large capacity that can store all the image data obtained by decompressing the entire compressed image data is not required. The analysis process will be described below in detail with reference to FIG. 3.

Figure 5:
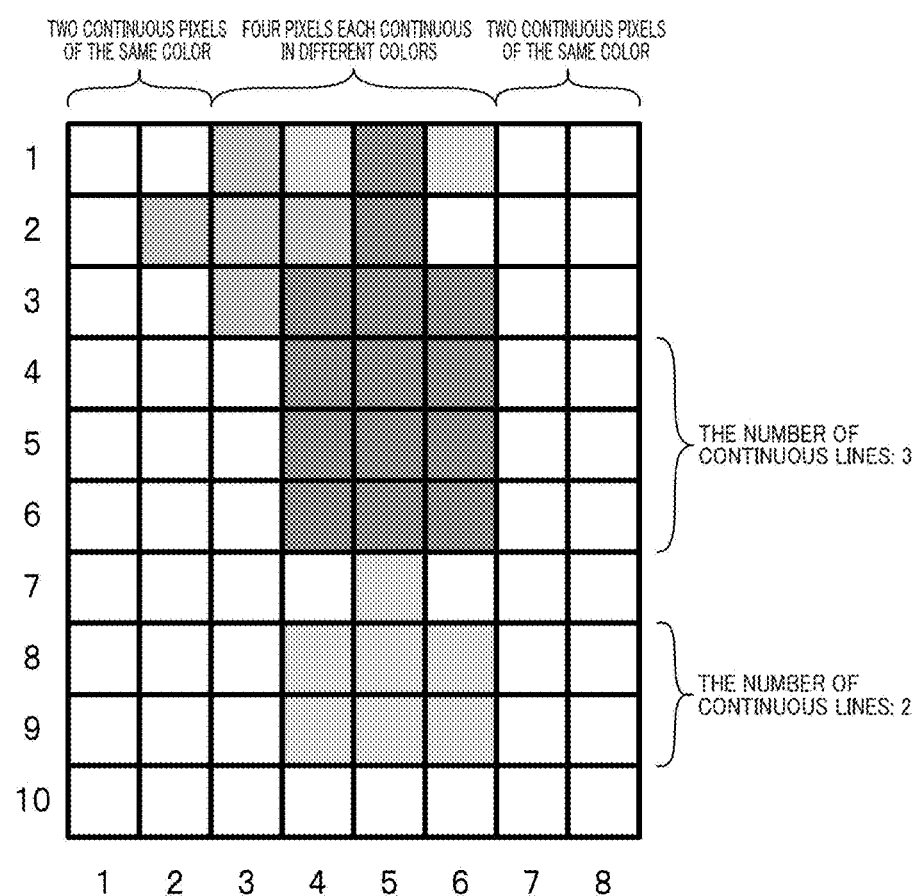
FIG. 5 is a view of pixels in an image.

In the following description, the analysis process will be described, taking, as an example, a case where the compressed image data representing a page containing an image illustrated in FIG. 5 is analyzed. The resolution of the image is 8 (width)×10 (height). That is, the number of pixels in the width direction is "8", and the number of pixels in the height direction is "10". Ten rows each constituted by eight pixels arranged in the width direction are arranged in the height direction. The rows may be hereinafter referred to respectively as "first row", "second row", "third row", "fourth row", "fifth row", "sixth row", "seventh row", "eighth row", "ninth row", and "tenth row" in the order from the upper side.

In the following description, there will be described a case where the image data is compressed image data which is compressed in the PackBits format.

Figure 3:
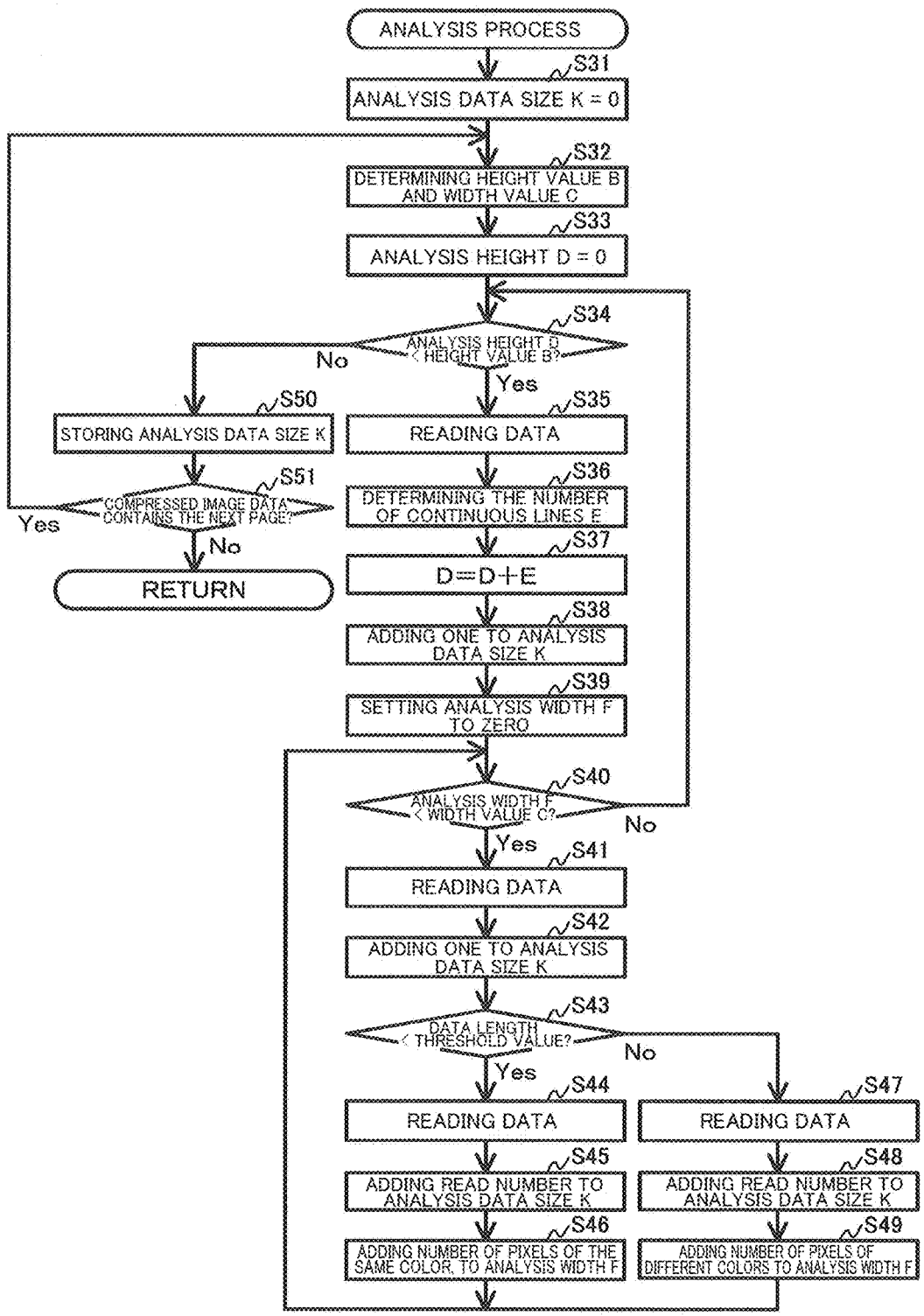
FIG. 3 is a flowchart representing an analysis process.
Figure 4:
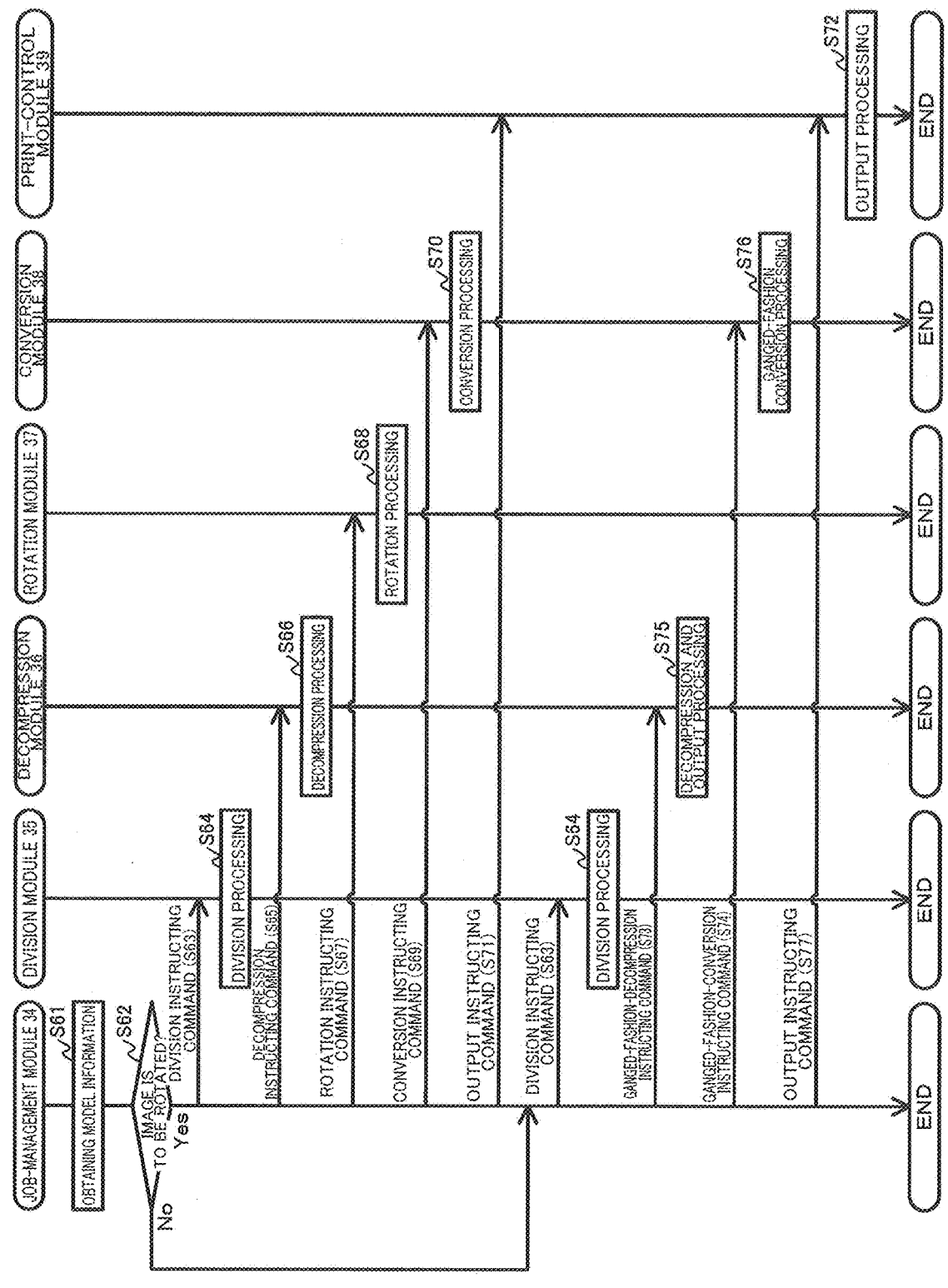
FIG. 4 is a view for explaining a page-job process.

As illustrated in FIG. 3, the registration module 33 at S31 sets an analysis data size K to an initial value. The analysis data size K indicates the number of unit data for which an analysis is completed after reading of the unit data.

The registration module 33 at S32 determines a height value B and a width value C based on the resolution contained in the obtained document information. The height value B indicates the number of pixels in the height direction which is indicated by the resolution. The width value C indicates the number of pixels in the width direction which is indicated by the resolution. In the example illustrated in FIG. 5, the height value B is ten, and the width value C is eight.

The registration module 33 at S33 sets an analysis height D to zero as an initial value. The analysis height D indicates the number of pixels in the height direction which indicates the total number of pixels indicating the analysis data size K for which the analysis is completed. That is, the analysis height D represents the number of rows for which the analysis is completed in the page. The total number of pixels indicating the analysis data size K for which the analysis is completed is one example of a count value.

The registration module 33 at S34 determines whether the analysis height D is less than the height value B. In the example illustrated in FIG. 5, the registration module 33 determines whether the analysis height D has reached ten as the height value B, in other words, the registration module 33 determines whether the analysis is completed for the first to tenth rows. That is, the registration module 33 at S34 determines whether the analysis for one page is completed.

The registration module 33 starts analyzing the next and subsequent rows when the registration module 33 at S34 determines that the analysis height D is less than the height value B (S34: Yes), that is, when the registration module 33 determines that the analysis for one page is not completed.

Specifically, the registration module 33 at S35 reads unit data having not been analyzed yet. The registration module 33 at S36 determines the number of continuous lines E based on the read unit data. In the example illustrated in FIG. 5, the fourth to sixth rows are the same as each other in the content of the pixels, and the eighth and ninth rows are the same as each other in the content of the pixels. The registration module 33 determines the numbers of continuous lines E=1, E=2, and E=3.

The registration module 33 at S37 adds the determined number of lines E to the analysis height D. For example, in the case where the number of continuous lines E is equal to three, "3" is added to the analysis height D. When the unit data is read, the registration module 33 at S38 adds "1" to the analysis data size K.

The registration module 33 at S39 sets an analysis width F to zero as an initial value. The analysis width F represents the number of pixels in the width direction which is indicated by the unit data being analyzed. The registration module 33 at S40 determines whether the analysis width F is less than the width value C. That is, the registration module 33 at S40 determines whether the pixel indicated by the unit data being analyzed has reached the pixel at the right end in FIG. 5.

When the analysis width F is greater than or equal to the width value C (S40: No), the registration module 33 executes processings at S34 and subsequent steps. When the registration module 33 determines that the analysis width F is less than the width value C (S40: Yes), the registration module 33 at S41 reads the unit data and obtains the data length of the read unit data. The data length indicates continuation of pixels of the same color and indicates continuation of pixels of different colors. When the unit data is read, the registration module 33 at S42 adds one to the analysis data size K.

The registration module 33 at S43 determines whether the data length obtained at S41 is less than a threshold value. That is, the registration module 33 at S43 determines whether the pixels of the same color continue, or the pixels of different colors continue. Specifically, in the case where the unit data is of eight bits, the registration module 33 determines whether the data length is less than 128 as the threshold value. The threshold value is stored in the ROM 24 and the EEPROM of the memory 22 in advance.

When the registration module 33 determines that the data length obtained at S41 is less than the threshold value, and the pixels of the same color continue (S43: Yes), the registration module 33 at S44 reads a number of the unit data which is related to the number of pixels of the same color which is indicated by the data length obtained at S41. The registration module 33 at S45 adds the read number of the unit data to the analysis data size K. The registration module 33 at S46 adds the number of pixels of the same color which is indicated by the data length obtained at S41, to the analysis width F.

When the registration module 33 determines that the data length obtained at S41 is greater than or equal to the threshold value, and the pixels of different colors continue (S43: No), the registration module 33 at S47 reads a number of the unit data which is related to the number of pixels of different colors which is indicated by the data length obtained at S41. The registration module 33 at S48 adds the read number of the unit data to the analysis data size K. The registration module 33 at S49 adds the number of pixels of different colors which is indicated by the data length obtained at S41, to the analysis width F.

After the execution at the processings at S46 and S49, the registration module 33 executes the processings at S40 and subsequent steps again.

When the registration module 33 at S34 determines that the analysis height D is greater than or equal to the height value B, and the total number of pixels indicated by the read unit data has reached the number of pixels for one page (S34: No), the registration module 33 at S50 stores the analysis data size K indicating the total number of the read unit data, into the RAM 25 or the EEPROM of the memory 22. In the example illustrated in FIG. 6, the registration module 33 stores, into the memory 22, (a) a first analysis data size K that is the size of data to the unit data indicating the last pixel of the first page, (b) a second analysis data size K that is the size of data to the unit data indicating the last pixel of the second page, and (c) a third analysis data size K that is the size of data to the unit data indicating the last pixel of the third page. The processing at S50 is one example of a determination processing.

The registration module 33 at S51 determines whether the compressed image data contains unit data having not been read. That is, the registration module 33 at S51 determines whether the compressed image data contains the next page.

When the registration module 33 determines that the compressed image data contains the next page (S51: Yes), the registration module 33 executes the processings at S32 and subsequent steps again. When the registration module 33 determines that the compressed image data does not contain the next page (S51: No), the analysis process ends.

As illustrated in FIG. 2, after the end of the analysis process (S17), the registration module 33 at S18 registers, with the job-management module 34, a number of the page jobs which corresponds to the number of the found pages. It is noted that the registration module 33 may register the page job with the job-management module 34 each time when a page is found in the analysis process.

The registration module 33 at S19 notifies the job-management module 34 of the page information on the registered page jobs. The page information contains the analysis data size K stored at S50 in the analysis process.

Though not indicated in the flowchart, when the page jobs are registered by the registration module 33, the job-management module 34 stores print queues into the RAM 25 of the memory 22. That is, the job-management module 34 creates the print queues. Specifically, the job-management module 34 creates the print queues in order of registration of the page jobs. For example, when the page jobs are registered in order of the page job for the first page, the page job for the second page, and the page job for the third page, the job-management module 34 stores the print queues into the RAM 25 in order of the print queue for the first page, the print queue for the second page, and the print queue for the third page. The job-management module 34 processes the print queues in order of registration. That is, the job-management module 34 processes the page jobs. These processings will be described below in detail.

The job-management module 34 at S20 uses the received page information to execute a page-job process for processing the registered page jobs. Specifically, the job-management module 34 divides the compressed image data into a plurality of the partial compressed data for respective pages, decompresses the partial compressed data to create the decompressed page data, converts the created decompressed page data to create the print data, and outputs the created print data to the print engine 15. To reduce the length of time required for creation of the print data, the job-management module 34 selects and determines commands to be input to the decompression module 36 and the conversion module 38, based on whether the image needs to be rotated. There will be described the page-job process with reference to FIG.

4. The decompressed page data is one example of the decompressed partial data. The processing at S20 is one example of a job processing.

In the following description, the page-job process for the first page (FIG. 6) will be explained. The job-management module 34 at S61 obtains the model information 28 by reading the model information 28 from the memory 22. The job-management module 34 at S62 determines whether the image represented by the compressed image data is to be rotated, based on the obtained model information 28 and the job information transmitted at S16 (FIG. 2). For example, in the case where the job information indicates printing on the sheet of the A4 size, and the model information 28 indicates sheet supply in the state in which the widthwise direction of the sheet coincides with the conveying direction, the job-management module 34 determines that the image is to be rotated 90 degrees. In the case where the job information indicates the duplex printing, and the model information 28 indicates sheet supply in the state in which the longitudinal direction of the sheet coincides with the conveying direction, the job-management module 34 at S62 determines that an image of a page to be printed on the back surface of the sheet is to be rotated 180 degrees. The processing at S62 is one example of a judgement processing.

When the job-management module 34 determines that the image is to be rotated (S62: Yes), the job-management module 34 at S63 inputs the division instructing command to the division module 35. The division instructing command instructs the division module 35 to create partial compressed data for the first page by dividing the compressed image data stored in the RAM 25 of the memory 22 and to store the created partial compressed data for the first page into the RAM 25. The division instructing command is attached with (a) the first analysis data size K contained in the page information transmitted from the registration module 33 at S19, and (b) area designating information for designating a storage area of the RAM 25.

Figure 6:
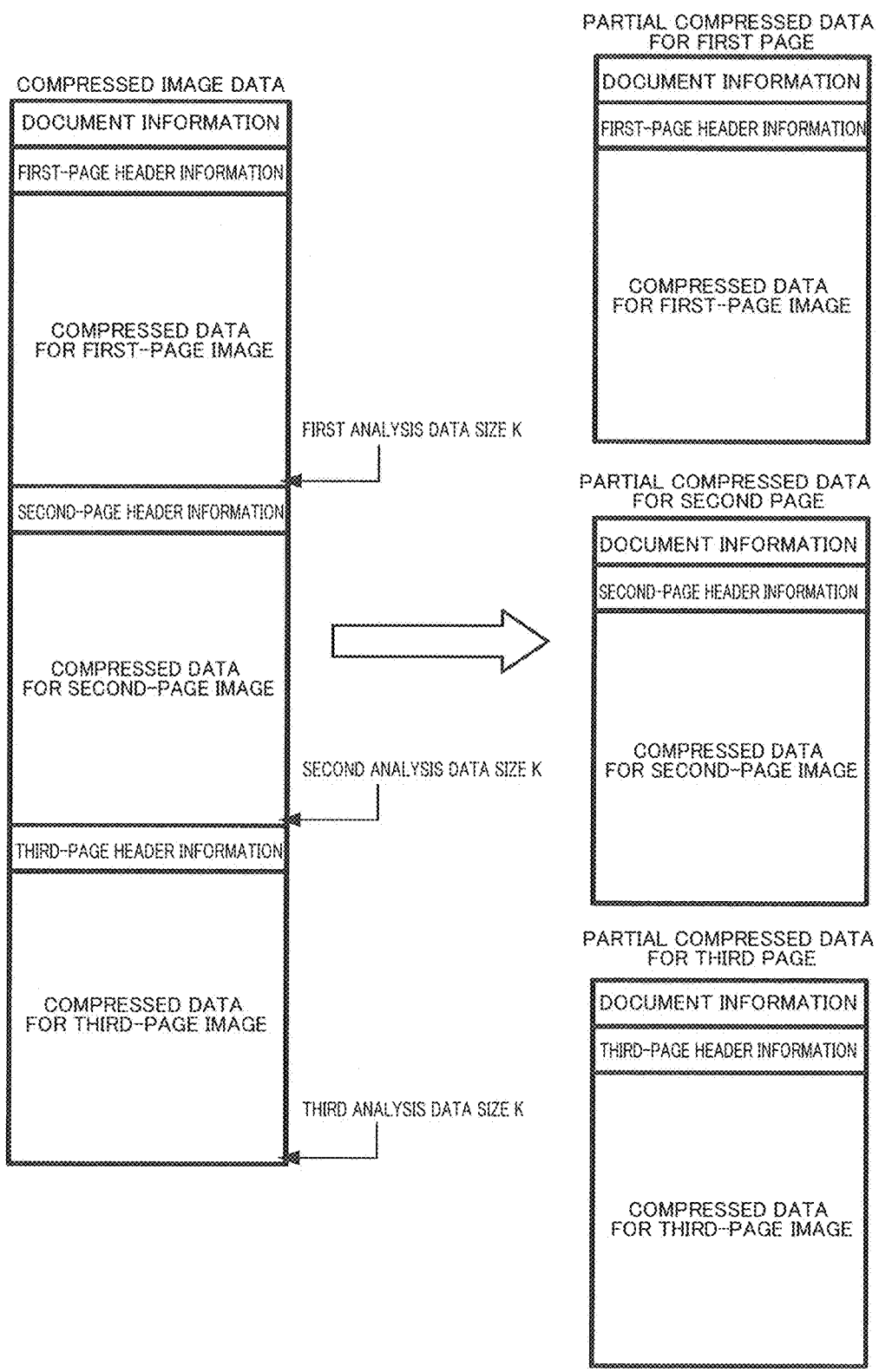
FIG. 6 is a view for explaining partial compressed data.

In response to receiving the division instructing command at S63, the division module 35 executes a division processing at S64. Specifically, the division module 35 reads the compressed image data from the RAM 25 of the memory 22. The division module 35 uses the first analysis data size K, as illustrated in FIG. 6, to divide the compressed image data at a position located between the compressed data for the first-page image and the second-page header information to create the partial compressed data for the first page and its remaining data. The division module 35 stores the created partial compressed data for the first page, into the storage area of the RAM 25 which is designated by the division instructing command. The remaining data is deleted without being stored into the memory 22.

It is noted that, in the case where the job-management module 34 executes the page-job process for the second page, for example, the job-management module 34 inputs, to the division module 35, a division instructing command attached with (a) the first analysis data size K and the second analysis data size K, and (b) area designating information for designating a storage area of the RAM 25. The division module 35 uses the first analysis data size K and the second analysis data size K, as illustrated in FIG. 6, to divide the compressed image data at a position located between the compressed data for the first-page image and the second-page header information and between the compressed data for the second-page image and the third-page header information and attach the document information to create partial compressed data for the second page and its remaining data. The remaining data is deleted without being stored into the memory 22.

In the case where the job-management module 34 executes the page-job process for the third page, for example, the job-management module 34 inputs, to the division module 35, a division instructing command attached with (a) the second analysis data size K and the third analysis data size K, and (b) area designating information for designating a storage area of the RAM 25. The division module 35 uses the second analysis data size K and the third analysis data size K, as illustrated in FIG. 6, to divide the compressed image data at a position located between the compressed data for the second-page image and the third-page header information and attach the document information to create partial compressed data of the third page and its remaining data. The remaining data is deleted without being stored into the memory 22.

The job-management module 34 determines whether the division module 35 has executed the division processing after the division instructing command is input to the division module 35. For example, the job-management module 34 uses polling, for example, to monitor the storage area of the RAM 25 designated by the division instructing command, and when the partial compressed data is stored into the storage area, the job-management module 34 determines that the division processing has been executed. Alternatively, when a response to the division instructing command is received from the division module 35 having executed the division processing, the job-management module 34 determines that the division processing has been executed.

When the job-management module 34 determines that the division processing has been executed, the job-management module 34 at S65 inputs, to the decompression module 36, a decompression instructing command for instructing decompression. The decompression instructing command is attached with area designating information indicating the storage area of the RAM 25 storing the partial compressed data and a storage area of the RAM 25 for storing the decompressed page data after decompression. The decompression instructing command is one example of a first instruction.

In response to receiving the decompression instructing command (S65), the decompression module 36 executes a decompression processing at S66. Specifically, the decompression module 36 reads the partial compressed data from the RAM 25 of the memory 22. The decompression module 36 inputs the partial compressed data read from the RAM 25, to the decompression IC 41 (FIG. 1B). The decompression IC 41 decompresses the input partial compressed data. The decompression IC 41 outputs the decompressed page data obtained by decompressing the input partial compressed data. The decompression module 36 stores the decompressed page data output by the decompression IC 41, into the storage area of the RAM 25 designated by the decompression instructing command. The partial compressed data is one example of conversion target data. The decompressed page data is one example of first converted data. The processing at S66 is one example of a first conversion processing.

It is noted that the job-management module 34 may output the decompression instructing command without determining whether the division processing has been executed. In this case, in response to receiving the decompression instructing command, the decompression module 36 uses polling, for example, to monitor whether the partial compressed data is stored into the RAM 25 of the memory 22, and the decompression module 36 executes the decompression processing (S66) when the partial compressed data is stored into the RAM 25.

After inputting the decompression instructing command into the decompression module 36, the job-management module 34 determines whether the decompression module 36 has executed the decompression processing. For example, the job-management module 34 uses polling, for example, to monitor the storage area of the RAM 25 designated by the decompression instructing command, and when the decompressed page data is stored into the storage area, the job-management module 34 determines that the decompression module 36 has executed the decompression processing. Alternatively, the job-management module 34 determines that the decompression module 36 has executed the decompression processing, when the job-management module 34 has received a response to the decompression instructing command from the decompression module 36 having executed the decompression processing.

When the job-management module 34 determines that the decompression module 36 has executed the decompression processing, the job-management module 34 at S67 inputs a rotation instructing command for instructing rotation, to the rotation module 37. The rotation instructing command is attached with area designating information indicating the storage area of the RAM 25 storing the decompressed page data and a storage area of the RAM 25 for storing the decompressed page data after rotation. The rotation instructing command is one example of a second instruction.

In response to receiving the rotation instructing command (S67), the rotation module 37 executes a rotation processing at S68. Specifically, the rotation module 37 reads the decompressed page data from the RAM 25 of the memory 22. The rotation module 37 executes a predetermined calculation processing for the decompressed page data read from the RAM 25 and executes a conversion processing of rotating the image represented by the decompressed page data. The predetermined calculation processing is installed in the rotation module 37 in advance. The rotation module 37 stores the decompressed page data obtained by the rotation, into a storage area of the RAM 25 designated by the rotation instructing command. The decompressed page data obtained by the rotation is one example of second converted data. The processing at S68 is one example of a second conversion processing.

It is noted that the job-management module 34 may output the rotation instructing command (S67) without determining whether the decompression processing has been executed. In this case, in response to receiving the rotation instructing command, the rotation module 37 uses polling, for example, to monitor whether the decompressed page data is stored into the RAM 25 of the memory 22, and the rotation module 37 executes the rotation processing when the decompressed page data is stored into the RAM 25.

After inputting the rotation instructing command to the rotation module 37, the job-management module 34 determines whether the rotation module 37 has executed the rotation processing. For example, the job-management module 34 uses polling, for example, to monitor the storage area of the RAM 25 designated by the rotation instructing command, and when the decompressed page data obtained by the rotation is stored into the storage area, the job-management module 34 determines that the rotation module 37 has executed the rotation processing. Alternatively, the job-management module 34 determines that the rotation module 37 has executed the rotation processing, when the job-management module 34 has received a response to the rotation instructing command from the rotation module 37 having executed the rotation processing.

When the job-management module 34 determines that the rotation module 37 has executed the rotation processing, the job-management module 34 at S69 inputs a conversion instructing command to the conversion module 38. The conversion instructing command is attached with area designating information indicating the storage area of the RAM 25 storing the decompressed page data obtained by the rotation and a storage area of the RAM 25 for storing the converted print data. The conversion instructing command is one example of a third instruction. Each of the processings at S63, S65, and S67 is one example of a non-ganged-fashion-execution instructing processing.

In response to receiving the conversion instructing command (S69), the conversion module 38 executes a conversion processing at S70. Specifically, the conversion module 38 reads the decompressed page data obtained by the rotation, from the RAM 25 of the memory 22. The conversion module 38 inputs the decompressed page data obtained by the rotation and read from the RAM 25, to the conversion IC 42 (FIG. 1B). The conversion IC 42 converts the input decompressed page data to the print data. The conversion IC 42 outputs the print data. The conversion module 38 stores the print data output by the conversion IC 42, into the storage area of the RAM 25 designated by the conversion instructing command. The processing at S70 is one example of a third conversion processing.

It is noted that the job-management module 34 may output the conversion instructing command without determining whether the rotation processing is executed. In this case, in response to receiving the conversion instructing command, the conversion module 38 uses polling, for example, to monitor whether the decompressed page data obtained by the rotation is stored in the RAM 25 of the memory 22, and the conversion module 38 executes the conversion processing when the decompressed page data obtained by the rotation is stored into the RAM 25.

After inputting the conversion instructing command to the conversion module 38, the job-management module 34 determines whether the conversion module 38 has executed the conversion processing. For example, the job-management module 34 uses polling, for example, to monitor the storage area of the RAM 25 designated by the conversion instructing command, and when the print data is stored into the storage area, the job-management module 34 determines that the conversion module 38 has executed the conversion processing. Alternatively, the job-management module 34 determines that the conversion module 38 has executed the conversion processing, when the job-management module 34 has received a response to the conversion instructing command from the conversion module 38 having executed the conversion processing.

When the job-management module 34 determines that the conversion module 38 has executed the conversion processing, the job-management module 34 at S71 inputs an output instructing command to the print-control module 39. The output instructing command is attached with area designating information indicating the storage area of the RAM 25 storing the print data.

In response to receiving the output instructing command (S71), the print-control module 39 executes an output processing at S72. Specifically, the print-control module 39 reads the print data from the RAM 25 of the memory 22. The print-control module 39 outputs the print data read from the RAM 25 to the drive circuit 19 of the drive elements 37.

It is noted that the job-management module 34 may output the output instructing command without determining whether the conversion module 38 has executed the conversion processing. In this case, in response to receiving the output instructing command, the print-control module 39 uses polling, for example, to monitor whether the print data is stored in the RAM 25 of the memory 22, and the print-control module 39 executes the output processing when the print data is stored into the RAM 25.

When the job-management module 34 at S62 determines that the image is not to be rotated (S62: No), the job-management module 34 executes the processing at S63 to input the division instructing command to the division module 35 (S64). When the job-management module 34 determines that the division module 35 has executed the division processing, the job-management module 34 at S73 inputs a ganged-fashion-decompression instructing command to the decompression module 36 and at S74 inputs a ganged-fashion-conversion instructing command to the conversion module 38. The ganged-fashion-decompression instructing command is one example of a first ganged-fashion-execution instruction. The ganged-fashion-conversion instructing command is one example of a second ganged-fashion-execution instruction. Each of the processings at S73 and S74 is one example of a ganged-fashion-execution instructing processing.

The ganged-fashion-decompression instructing command is attached with information indicating an area of the RAM 25 of the memory 22 storing the partial compressed data. The ganged-fashion-conversion instructing command is attached with information indicating an area of the RAM 25 of the memory 22 for storing the print data.

In response to receiving the ganged-fashion-decompression instructing command (S73), the decompression module 36 executes a decompression and output processing at S75. Specifically, the decompression module 36 reads the partial compressed data from the storage area of the RAM 25 designated by the ganged-fashion-decompression instructing command. The job-management module 34 inputs the read partial compressed data to the decompression IC 41 (FIG. 1B). The decompression IC 41 decompresses the input partial compressed data and outputs the decompressed page data that is the decompressed partial compressed data. The output decompressed page data is input to the conversion IC 42 through the connection line 43 (FIG. 1B). The conversion IC 42 converts the input decompressed page data to the print data and outputs the print data.

In response to receiving the ganged-fashion-conversion instructing command (S74), the conversion module 38 executes a ganged-fashion conversion processing at S76. Specifically, the conversion module 38 stores the print data output by the conversion IC 42, into the storage area of the RAM 25 designated by the ganged-fashion-conversion instructing command.

The job-management module 34 uses polling, for example, to monitor the area of the RAM 25 storing the print data. When the job-management module 34 determines that the print data with an amount enough for an output to the drive circuit 19 is stored into the RAM 25, the job-management module 34 at S77 inputs the output instructing command to the print-control module 39. The output instructing command is attached with information indicating a storage area of the RAM 25 for storing the print data. Examples of the print data with the amount enough for the output to the drive circuit 19 include: print data for one page; and print data for an amount less than one page. The print data with the amount enough for the output to the drive circuit 19 varies with the specifications of the printer 10.

In response to receiving the output instructing command (S77), the print-control module 39 at S72 executes the output processing for outputting the print data to the drive circuit 19.

As illustrated in FIG. 2, after executing the page job process (S20), the job-management module 34 finishes the page job at S21. Specifically, after recognizing that the print engine 15 finishes printing based on the output print data, the job-management module 34 deletes the print queues stored in the RAM 25 of the memory 22. The processing at S20 is one example of a page-job finishing processing.

The job-management module 34 finishes the print job at S22 when all the print queues are deleted from the RAM 25 of the memory 22, that is, when printing for all the pages is completed.

Effects

In the present embodiment, in the case where the rotation processing is not required, the decompressed page data decompressed and output by the decompression IC 41 is input to the conversion IC 42 without being stored into the memory 22. Thus, in the case where the rotation processing is not required, a short length of time is required for creation of the print data. Specifically, in the case where the rotation processing is not required and in the case where the decompressed page data output by the decompression IC 41 is stored into the memory 22, and the conversion module 38 reads the decompressed page data from the memory 22 and inputs the read decompressed page data to the conversion IC 42, writing of the decompressed page data to the memory 22 and reading of the decompressed page data from the memory 22 require a certain length of time. In the present embodiment, the decompressed page data decompressed and output by the decompression IC 41 is directly input to the conversion IC 42 without being stored into the memory 22. This configuration reduces the length of time required for creation of the print data by a length of time required for the writing and reading of the decompressed page data to and from the memory 22.

In the present embodiment, the control program 27 divides the compressed image data and creates the print data by decompressing the partial compressed data obtained by the division. That is, in the printer capable of creating the print data from the compressed image data and performing printing, the length of time required for creation of the print data is reduced.

In the present embodiment, the division module 35 lower than the job-management module 34 divides the compressed image data to create the partial compressed data. The partial compressed data each for one page are subsequently created, and the partial compressed data is decompressed and converted to the print data for one page each time. Thus, the partial compressed data for all the pages are not stored into the memory 22 at a time, and accordingly it is possible to reduce the capacity of the RAM 25 of the memory 22 when compared with the case where the partial compressed data for all the pages are stored into the memory 22 at a time. Also, even in the case where the RAM 25 of the memory 22 has a capacity not enough to store the partial compressed data for all the pages, the controller 11 can convert the input compressed data to the print data and perform printing.

In the present embodiment, the job-management module 34 uses polling, for example, to monitor the area of the RAM 25 storing the print data, and when the print data with the amount enough for the output to the drive circuit 19 is stored into the RAM 25, the output instructing command is input to the print-control module 39 (S77). Accordingly, even in the case where the decompressed page data is directly input from the decompression IC 41 to the conversion IC 42 when the rotation processing (S68) is not required (S62: No), the controller 11 can reliably output the print data with the amount enough for the output to the drive circuit 19. Specifically, in the case where the conversion module 38 reads the decompressed page data from the memory 22 and converts the read decompressed page data, the conversion module 38 can recognize an amount of the created print data. However, if the decompressed page data is directly input from the decompression IC 41 to the conversion IC 42, the conversion module 38 cannot recognize the amount of the created print data. In the present embodiment, the job-management module 34 uses polling, for example, to monitor the print data and transmits an output instruction to the print-control module 39 (S77). Accordingly, the job-management module 34 can reliably output the print data with the amount enough for the output to the drive circuit 19.

Modifications

In the above-described embodiment, the compressed image data is divided by the division module 35 of the job-management module 34. However, the compressed image data may be divided by the registration module 33. In this case, the division module 35 is not provided in the job-management module 34. After the analysis process at S17 (FIG. 2), the registration module 33 executes the division processing at S64 (FIG. 4) to store the partial compressed data for the first page, the partial compressed data for the second page, and the partial compressed data for the third page into the RAM 25 of the memory 22. In this case, the RAM 25 having a capacity enough to store the partial compressed data for the first page, the partial compressed data for the second page, and the partial compressed data for the third page is required. That is, the RAM 25 having a large capacity is required when compared with the above-described embodiment which needs the RAM 25 having a capacity enough to individually store each of the partial compressed data for the first page, the partial compressed data for the second page, and the partial compressed data for the third page. In the above-described embodiment, however, the controller 11 needs to execute three division processings, i.e., the division processing for creating the partial compressed data for the first page, the division processing for creating the partial compressed data for the second page, and the division processing for creating the partial compressed data for the third page, but in the case where the registration module 33 divides the compressed image data, all the partial compressed data are created in one division processing. That is, in the case where the registration module 33 divides the compressed image data, the RAM 25 having a large capacity is required when compared with the above-described embodiment, but the length of time required for creation of the print data is much shorter.

In the above-described embodiment, the rotation processing (S68) is described as one example of the second conversion processing. However, the second conversion processing may be any other processing. Examples of any other processing include: a processing for adding text data indicating a printing time, to a page header and a page footer; a processing for adding margins to the page; and a processing for changing the size of each of the margins of the page.

In the above-described embodiment, the compressed image data containing the plurality of pages is input to the printer 10. However, a plurality of the compressed image data each including the compressed image data for one page may be sequentially input to the printer 10. In this case, the print data is created without executing the analysis process (S17) and the division processing (S64).

Figure 7:
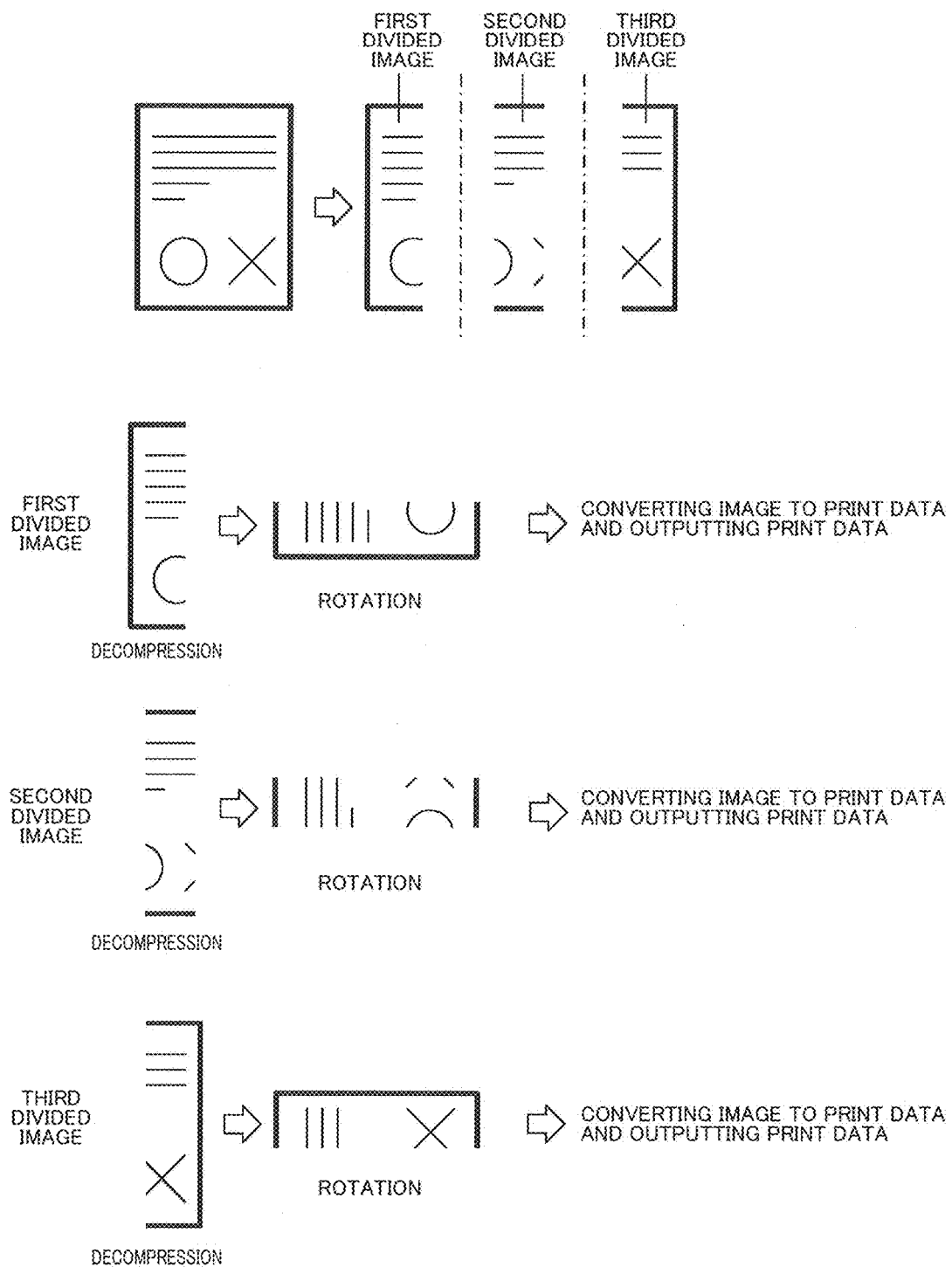
FIG. 7 is a view for explaining processings for dividing partial compressed data into separate partial compressed data.

In the above-described embodiment, the compressed image data containing the plurality of pages is divided into the partial compressed data each for one page to create the print data each for one page. However, as illustrated in FIG. 7, the partial compressed data for one page may be further divided into a plurality of separate partial compressed data. Each of the separate partial compressed data represents a corresponding one of separate images obtained by dividing an image for one page. In the example illustrated in FIG. 7, the image for one page is divided into a first separate image, a second separate image, and a third separate image. In the analysis process (S17), the registration module 33 stores a data size K indicating unit data serving as a dividing position, into the memory 22. After creating the partial compressed data for one page in the division processing (S64), the division module 35 uses the unit data indicated by the data size K stored in the memory 22 to further divide the partial compressed data to create a plurality of the separate partial compressed data. As in the above-described embodiment, the decompression processing (S66), the rotation processing (S68), and the conversion processing (S70) are executed for each of the separate partial compressed data to convert the separate partial compressed data to print data and output the print data.

In the above-described embodiment, it is determined whether the analysis of one page is finished, based on determining whether the analysis height D is less than the height value B (S34) in the analysis process. However, it may be determined whether the analysis of one page is finished, based on determining whether the total number of pixels represented by the analyzed unit data has reached the total number of pixels for one page which is indicated by the resolution. The total number of pixels for one page which is indicated by the resolution is 360000 in the case where the resolution is 600×600, for example.

What is claimed is:

1. A printing apparatus, comprising a controller,
   the controller comprising:
     a memory;
     a computer;
     a program comprising a plurality of modules executable by the computer;
     a first electronic circuit configured to convert and output input data; and
     a second electronic circuit configured to convert and output input data and configured to execute a conversion different from a conversion executed by the first electronic circuit, the second electronic circuit being connected to the first electronic circuit by a connection line,
   the plurality of modules comprising:
     a reception module configured to cause the computer to execute a receiving processing in which the computer receives image data and a print setting;
     a registration module configured to cause the computer to execute a job-registration processing in which the computer registers a job based on the image data and the print setting, with a job-management module; and
     the job-management module configured to cause the computer to execute a job processing in which the computer creates print data by converting the image data indicated by the registered job, outputs the created print data, and processes the registered job, the job-management module comprising:
- a first sub-module configured to cause the computer to execute a first conversion processing in which the computer uses the first electronic circuit to convert conversion target data related to the image data, to first converted data;
- a second sub-module configured to cause the computer to execute a second conversion processing in which the computer converts the first converted data to second converted data;
- a third sub-module configured to cause the computer to execute a third conversion processing in which the computer uses the second electronic circuit to convert the second converted data to the print data; and
- a fourth sub-module configured to cause the computer to execute an output processing in which the computer outputs the print data, the job-management module being configured to cause the computer to execute:
- a judgement processing in which the computer determines whether the computer causes the second sub-module to execute the second conversion processing, based on at least one of the print setting indicated by the registered job and setting information stored in the memory;
- a non-ganged-fashion-execution instructing processing in which, when the computer determines that the second conversion processing is to be executed, the computer inputs, to the first sub-module, a first instruction for causing the computer to execute the first conversion processing to store the first converted data into the memory, the computer inputs, to the second sub-module, a second instruction for causing the computer to execute the second conversion processing to store the second converted data into the memory, and the computer inputs, to the third sub-module, a third instruction for causing the computer to execute the third conversion processing to output the print data; and
- a ganged-fashion-execution instructing processing in which, when the computer determines that the second conversion processing is not to be executed, the computer inputs, to the first sub-module, a first ganged-fashion-execution instruction for causing the computer to execute the first conversion processing to input the first converted data to the second electronic circuit via the connection line, and the computer inputs, to the third sub-module, a second ganged-fashion-execution instruction for causing the computer to output the print data based on data obtained by conversion executed by the second electronic circuit.

2. The printing apparatus according to claim 1, wherein the job-management module is configured to cause the computer to, when the computer determines in the judgement processing that the second conversion processing is not to be executed, input the first converted data having not been converted in the second conversion processing, to the second electronic circuit in the ganged-fashion-execution instructing processing.

3. The printing apparatus according to claim 1,
wherein the reception module is configured to, in the receiving processing, receive an input of compressed image data that is the image data having been compressed,
wherein the first sub-module is configured to, in the first conversion processing, cause the first electronic circuit to execute a conversion of decompressing partial compressed data obtained by dividing the compressed image data, and outputting decompressed partial data, and
wherein the partial compressed data is the conversion target data, and the decompressed partial data is the first converted data.

4. The printing apparatus according to claim 3,
wherein the registration module is configured to cause the computer to execute a determination processing in which the computer counts a plurality of pixels respectively represented by a plurality of unit data contained in the compressed image data, and determines the unit data serving as a separator among a plurality of the partial compressed data, based on a count value, and
wherein the job-management module further comprises a fifth sub-module configured to cause the computer to repeat a division processing in which the computer, based on the unit data determined in the determination processing, divides the compressed image data into a plurality of the partial compressed data and stores one of the plurality of the partial compressed data into a designated area of the memory.

5. The printing apparatus according to claim 3, wherein the registration module is configured to cause the computer to execute:
- a determination processing in which the computer counts a plurality of pixels respectively represented by a plurality of unit data contained in the compressed image data, and determines the unit data serving as a separator among a plurality of the partial compressed data, based on a count value; and
- a division processing in which the computer, based on the unit data determined in the determination processing, divides the compressed image data into a plurality of the partial compressed data and stores the plurality of the partial compressed data into a designated area of the memory.

6. The printing apparatus according to claim 3, wherein the computer is configured to, in the second conversion processing, change an orientation of an image represented by the partial compressed data.

7. The printing apparatus according to claim 1,
wherein the registration module is configured to, in the job-registration processing, cause the computer to register a page job based on a page contained in the image data, with the job-management module, and
wherein the job-management module is configured to cause the computer to execute a page-job finishing processing in which the computer obtains a data size for one page based on the print setting, and finishes the registered page job when a data size of the print data output by the third sub-module having inputted the second ganged-fashion-execution instruction has become the data size for one page.

* * * * *